(12) United States Patent
Taenaka et al.

(10) Patent No.: US 9,157,513 B2
(45) Date of Patent: Oct. 13, 2015

(54) RACK GUIDE UNIT AND STEERING SYSTEM INCLUDING THE RACK GUIDE UNIT

(71) Applicant: JTEKT CORPORATION, Osaka-shi, Osaka (JP)

(72) Inventors: Makoto Taenaka, Kashiba (JP); Akitake Kawakubo, Nara (JP)

(73) Assignee: JTEKT CORPORATION, Osaka (JP)

( * ) Notice: Subject to any disclaimer, the term of this patent is extended or adjusted under 35 U.S.C. 154(b) by 26 days.

(21) Appl. No.: 14/273,956

(22) Filed: May 9, 2014

(65) Prior Publication Data

US 2014/0338486 A1 Nov. 20, 2014

(30) Foreign Application Priority Data

May 16, 2013 (JP) ................... 2013-104205

(51) Int. Cl.
*B62D 3/12* (2006.01)
*F16H 19/04* (2006.01)

(52) U.S. Cl.
CPC ............... *F16H 19/04* (2013.01); *B62D 3/123* (2013.01); *Y10T 74/1967* (2015.01)

(58) Field of Classification Search
CPC ..................... B62D 3/123; Y10T 74/1967
See application file for complete search history.

(56) References Cited

U.S. PATENT DOCUMENTS

| | | | | |
|---|---|---|---|---|
| 3,433,501 | A * | 3/1969 | Hertel ..................... | 280/93.515 |
| 2008/0034911 | A1* | 2/2008 | Bieber et al. ................. | 74/422 |
| 2009/0223314 | A1* | 9/2009 | Eickholt ....................... | 74/422 |
| 2013/0036845 | A1* | 2/2013 | Amada et al. ................ | 74/30 |
| 2013/0091979 | A1* | 4/2013 | Bareis et al. ................ | 74/568 R |
| 2014/0251035 | A1* | 9/2014 | Ricker ........................ | 74/30 |
| 2014/0260719 | A1* | 9/2014 | Bae et al. .................... | 74/30 |
| 2015/0020619 | A1* | 1/2015 | Son et al. .................... | 74/30 |

FOREIGN PATENT DOCUMENTS

| | | |
|---|---|---|
| FR | 1 327 797 | 4/1963 |
| GB | 976661 | 12/1964 |
| GB | 1077199 | 7/1967 |
| JP | A-11-043055 | 2/1999 |
| JP | A-2005-14815 | 1/2005 |

OTHER PUBLICATIONS

Sep. 11, 2014 Written Opinion and Search Report issued in European Application No. 14168082.7.

* cited by examiner

*Primary Examiner* — Ruth Ilan
(74) *Attorney, Agent, or Firm* — Oliff PLC

(57) ABSTRACT

A rack guide unit includes a closure member secured to an external opening end of an accommodation portion of a housing, and a rack guide. Coned disc springs that urge the rack guide toward a rack shaft are interposed between the closure member and the rack guide. A protrusion of the closure member is passed through the coned disc springs and inserted in a recessed portion of the rack guide. An O-ring held in an accommodation groove formed in the outer periphery of the protrusion, at a position closer to the distal end of the protrusion than the coned disc springs are, functions as a retaining protrusion that restrains the coned disc springs from coming off the protrusion. For example, the coned disc springs and the closure member constitute a subassembly formed in advance.

20 Claims, 7 Drawing Sheets

RACK GUIDE UNIT AND STEERING SYSTEM INCLUDING THE RACK GUIDE UNIT

INCORPORATION BY REFERENCE

The disclosure of Japanese Patent Application No. 2013-104205 filed on May 16, 2013 including the specification, drawings and abstract is incorporated herein by reference in its entirety.

BACKGROUND OF THE INVENTION

1. Field of the Invention

The invention relates to a rack guide unit and a steering system including the rack guide unit.

2. Description of the Related Art

Generally, a rack-and-pinion-type steering system is provided with a rack guide unit that reduces a backlash between a rack and a pinion. In the rack guide unit, when a rack guide by which a rack shaft is slidably supported wears out, a compression coil spring interposed between the rack guide and a plug pushes the rack guide toward the rack shaft to compensate for a clearance between the rack guide and the plug.

According to Japanese Patent Application Publication No. 11-43055 (JP 11-43055 A), a coned disc spring is interposed between a rack guide and a plug so as to be installed in series with a compression coil spring. The coned disc spring is deformed to absorb an impact only when an excessively high impact load is input into the coned disc spring.

In FIG. 4 in JP 11-43055 A, the coned disc spring and an intervening member are accommodated and held in a tubular portion formed in the plug. In JP 11-43055 A, the intervening member is referred to as "second rack support". The intervening member is interposed between the compression coil spring and the coned disc spring. Specifically, the intervening member is held by a snap ring that is fitted in both a circumferential groove formed in the inner periphery of the tubular portion that guides the outer periphery of the coned disc spring and a circumferential groove formed in the outer periphery of the intervening member, and the coned disc spring is held between the intervening member and the bottom of tubular portion.

According to the technique described in JP 11-43055 A, in order to hold the coned disc spring and the intervening member in the plug, a cumbersome work for fitting the snap ring in both the circumferential groove of the plug and the circumferential groove of the intervening member is required. Thus, the total number of man-hours needed to obtain a subassembly of a rack guide unit including the plug is increased. This affects the efficiency of assembly of the rack guide unit.

SUMMARY OF THE INVENTION

One object of the invention is to provide a rack guide unit that is assembled with ease as a whole, and to provide a steering system including the rack guide unit.

A rack guide unit according to an aspect of the invention includes: a rack guide accommodated in an accommodation portion formed in a housing through which a rack shaft meshed with a pinion shaft is passed, so as to be allowed to approach and move away from the rack shaft, the rack guide supporting the rack shaft such that the rack shaft is slidable in an axial direction of the rack shaft; a closure member secured to an external opening end of the accommodation portion, the external opening end being located on an opposite side of the accommodation portion from the rack shaft; at least one coned disc spring that is interposed between the closure member and the rack guide, and that urges the rack guide toward the rack shaft; a recessed portion formed in an opposed portion of the rack guide, the opposed portion being opposed to the closure member; a protrusion that is formed on the closure member, passed though the coned disc spring, and inserted in the recessed portion; and a retaining protrusion formed integrally with an outer periphery of the protrusion or formed separately from the protrusion and attached to the outer periphery of the protrusion, and located at a position closer to a distal end of the protrusion than the coned disc spring is, the retaining protrusion restraining the coned disc spring from coming off the protrusion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
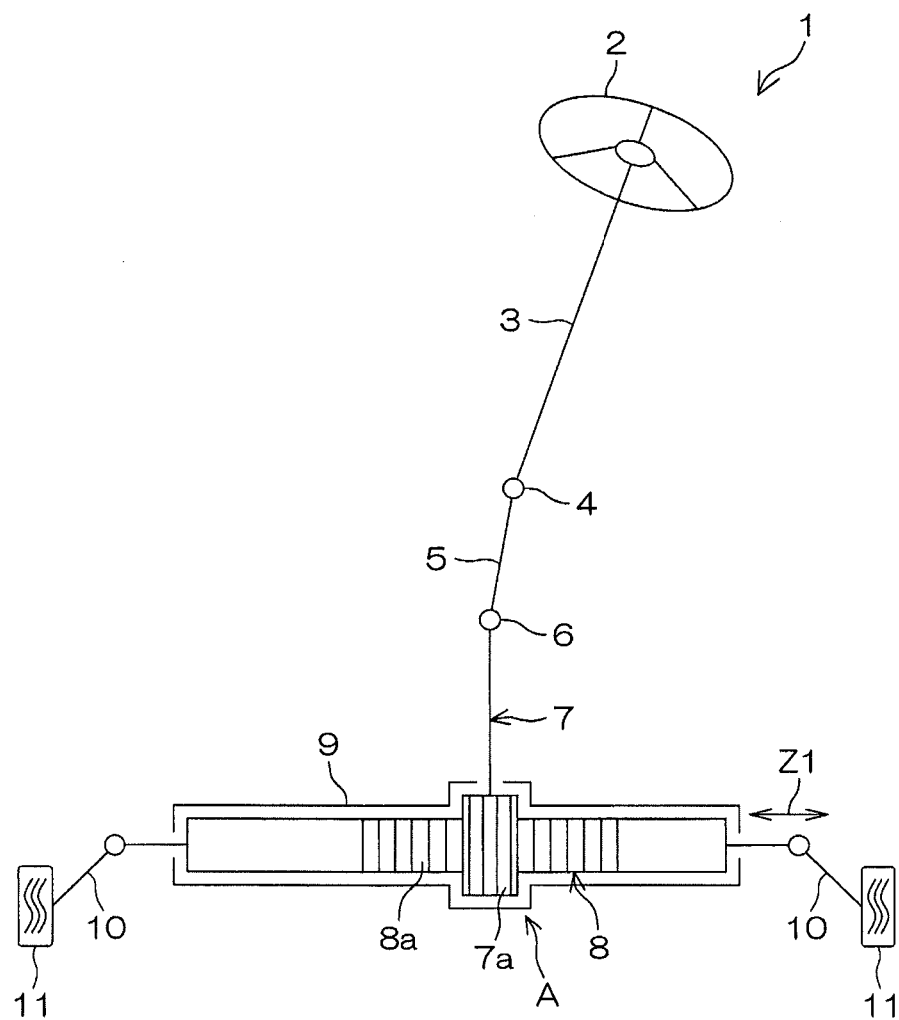
FIG. 1 is a view schematically illustrating the configuration of a rack-and-pinion-type steering system according to a first embodiment of the invention.

Hereinafter, example embodiments of the invention will be described with reference the accompanying drawings. FIG. 1 is a schematic view illustrating the configuration of a steering system 1 to which a rack guide unit 15 according to a first embodiment of the invention is applied. As illustrated in FIG. 1, the steering system 1 includes a steering shaft 3, an intermediate shaft 5, a pinion shaft 7 and a rack shaft 8. The steering shaft 3 is coupled to a steering member 2 such as a steering wheel. The intermediate shaft 5 is coupled to the steering shaft 3 via a universal joint 4. The pinion shaft 7 is coupled to the intermediate shaft 5 via a universal joint 6. The rack shaft 8 has a rack 8a that is meshed with a pinion 7a provided on the pinion shaft 7 at a position near one end of the pinion shaft 7. The rack shaft 8 serves as a steered shaft extending in the lateral direction of a vehicle. The pinion shaft 7 and the rack shaft 8 constitute a rack-and-pinion mechanism A that serves as a steering mechanism.

The rack shaft 8 is held via a plurality of bearings (not illustrated) by a rack housing 9 secured to a vehicle body so as to be allowed to make a linear reciprocating motion along an axial direction Z1. Opposite end portions of the rack shaft 8 protrude on the opposite sides from the rack housing 9, and tie rods 10 are respectively coupled to the opposite end portions of the rack shaft 8. The tie rods 10 are linked to corresponding steered wheels 11 via corresponding knuckle arms (not illustrated).

Figure 2:
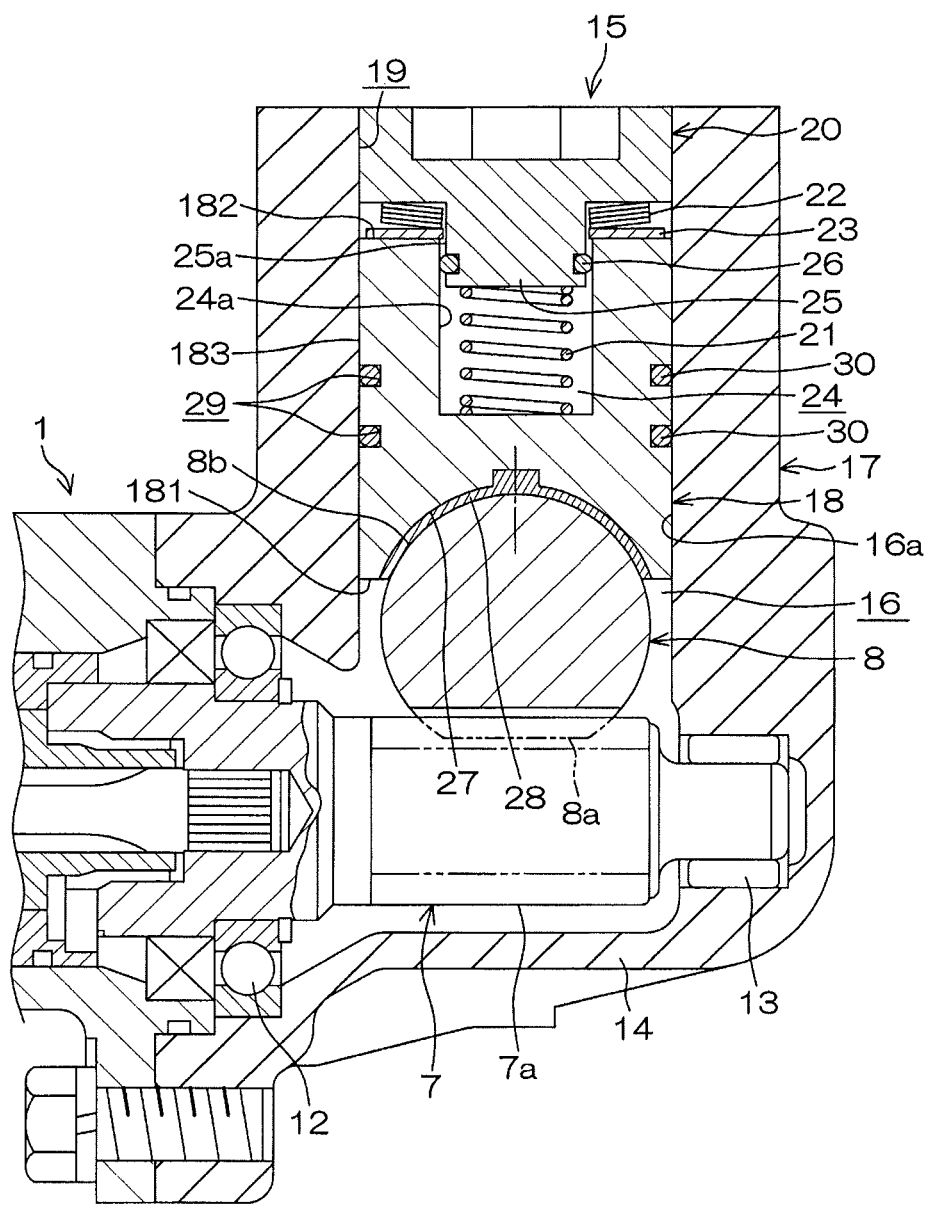
FIG. 2 is a sectional view illustrating main portions of the steering system including a rack guide unit according to the first embodiment.

When the steering shaft 3 is rotated in response to an operation of the steering member 2, the rotation of the steering shaft 3 is converted into a linear motion of the rack shaft 8 in the axial direction Z1 by the pinion 7a and the rack 8a. Thus, the steered wheels 11 are steered. As illustrated in FIG. 2 that is a sectional view of main portions of the steering system 1, the pinion shaft 7 is rotatably held by a first bearing 12 and a second bearing 13 in a pinion housing 14. The first bearing 12 is, for example, a ball bearing, and the second bearing 13 is, for example, a cylindrical roller bearing. The pinion 7a of the pinion shaft 7 and the rack 8a of the rack shaft 8 are meshed with each other in the pinion housing 14.

The steering system 1 includes the rack guide unit 15 according to the first embodiment. The rack guide unit 15 includes a housing 17 and a rack guide 18. The housing 17 defines an accommodation portion 16 that is a circular hole through which the rack shaft 8 is passed. The rack guide 18 is accommodated in the accommodation portion 16 so as to be allowed to approach and move away from the rack shaft 8. A back side 8b of the rack shaft 8, which is on the opposite side of the rack shaft 8 from the rack 8a, is slidably supported by the rack guide 18. The rack guide unit 15 includes a closure member 20, a compression coil spring 21, at least one coned disc spring 22 (in the invention, a plurality of coned disc springs 22 is provided), and an annular seat plate 23. The closure member 20 is a plug fitted to an external opening end 19 of the accommodation portion 16. The external opening end 19 is located on the opposite side of the accommodation portion 16 from the rack shaft 8. The compression coil spring 21 and the coned disc springs 22 are interposed between the rack guide 18 and the closure member 20. The seat plate 23 is interposed between the coned disc springs 22 and the rack guide 18 so as to receive a load from the coned disc springs 22.

The rack guide unit 15 includes a recessed portion 24, a columnar protrusion 25 and an O-ring 26. The recessed portion 24 is formed in the rack guide 18. The protrusion 25 is formed on the closure member 20, passed through the coned disc springs 22 and the seat plate 23, and inserted in the recessed portion 24. The O-ring 26 is an elastic member that is held by an outer periphery 25a of the protrusion 25, at a position closer to the distal end of the protrusion 25 than the seat plate 23 is, and that may function as a retaining protrusion. The O-ring 26 (elastic member), which may function as the retaining protrusion, has the function of restraining the coned disc springs 22 and the seat plate 23 from coming off the protrusion 25. The O-ring 26 is frictionally engaged with an inner periphery 24a (cylindrical face) of the recessed portion 24, and applies a frictional resistance load to the rack guide 18 when the rack guide 18 is moved toward the closure member 20 by an input load from the rack shaft 8 side.

The housing 17 of the rack guide unit 15 and the pinion housing 14 are made of the same material and formed as a single-piece member. The housing 17 is disposed on the opposite side of the rack shaft 8 from the pinion shaft 7. The pinion housing 14 and the housing 17 are formed by, for example, die casting. The rack guide 18 has a first face 181, a second face 182, and an outer peripheral face 183 that is a cylindrical face. The first face 181 is opposed to the rack shaft 8. The second face 182 is located on the opposite side of the rack guide 18 from the first face 181. A concave face 27 having a shape that conforms to the shape of the back side 8b of the rack shaft 8 is formed in the first face 181 of the rack guide 18. A curved sliding plate 28 is attached to the concave face 27 so as to conform to the concave face 27. The sliding plate 28 is in sliding contact with the back side 8b of the rack shaft 8. Preferably, a plate having a low frictional coefficient is used as the sliding plate 28. For example, a metal plate or a metal plate coated with a fluorine resin may be used as the sliding plate 28.

Annular elastic members 30 such as O-rings are respectively accommodated and held in multiple annular accommodation grooves 29 formed in the outer peripheral face 183 of the rack guide 18. The rack guide 18 has an outer diameter that is slightly smaller than the inner diameter of the accommodation portion 16. As the elastic members 30 slide on an inner periphery 16a of the accommodation portion 16, the rack guide 18 moves in the accommodation portion 16 in such directions as to approach and move away from the rack shaft 8. The elastic members 30 has the function of restraining the rack guide 18 from tilting within the accommodation portion 16.

Figure 3:
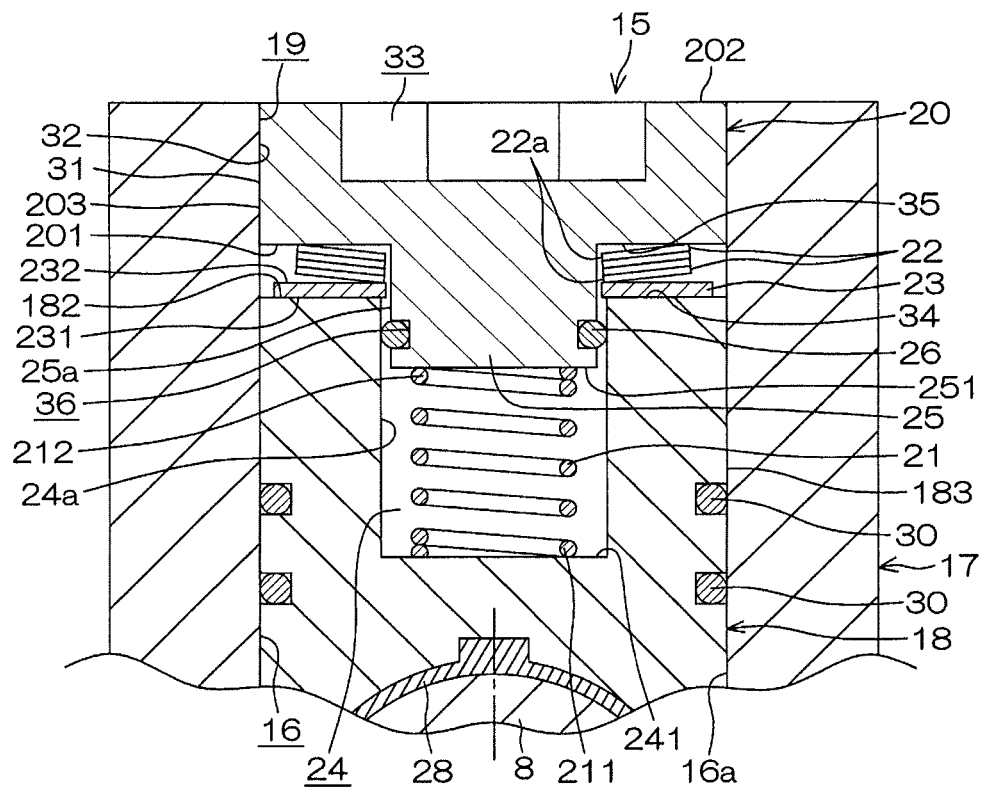
FIG. 3 is an enlarged sectional view of the rack guide unit according to the first embodiment.

As illustrated in FIG. 3 that is an enlarged view of part of FIG. 2, the recessed portion 24 is, for example, a circular central hole formed in the second face 182 of the rack guide 18, and accommodates the compression coil spring 21. A first end portion 211 of the compression coil spring 21 is received by a bottom 241 of the recessed portion 24. The inner periphery 24a of the recessed portion 24 has the function of guiding radially outer portions of the compression coil spring 21. As illustrated in FIG. 2 and FIG. 3, the closure member 20 is a plug that has a first face 201 and a second face 202. The first face 201 is opposed to the second face 182 of the rack guide 18. The second face 202 is located on the opposite side of the closure member 20 from the first face 201. The closure member 20 has an external thread 31 formed on its outer periphery 203. In addition, an internal thread 32 is formed in the inner periphery 16a of accommodation portion 16, within a range from the external opening end 19 to a position that is apart from the external opening end 19 by a prescribed distance. The external thread 31 of the closure member 20 is screwed to the internal thread 32 to secure the closure member 20 to the housing 17. A tool engagement hole 33 having a polygonal sectional shape (for example, a hexagonal sectional shape), in which a tool for screwing the closure member 20 to the housing 17 is engaged, is formed in the second face 202 of the closure member 20.

The protrusion 25 is formed on the first face 201 of the closure member 20, and is inserted in the recessed portion 24. The compression coil spring 21 is interposed, in a compressed state, between an end face 251 of the protrusion 25 of the closure member 20 and the bottom 241 of the recessed portion 24 of the rack guide 18, and elastically urges the rack guide 18 toward the rack shaft 8. The outer periphery of the protrusion 25 serves as a guide for radially inner portions 22a of the coned disc springs 22.

An annular seat face 34 that surrounds the recessed portion 24 is formed in the second face 182 of the rack guide 18. The closure member 20 has an annular seat face 35 that surrounds the protrusion 25 and that is opposed to the seat face 34. The coned disc springs 22 and the seat plate 23 are interposed between the seat faces 34, 35. The seat plate 23 is disposed along the seat face 34 of the rack guide 18. That is, the seat plate 23 has a first face 231 and a second face 232. The first face 231 extends along the seat face 34 of the rack guide 18. The second face 232 serves as a seat face that receives a load from the coned disc springs 22. The distance between the second face 232 of the seat plate 23 and the seat face 35 is set greater than the length of the plurality of coned disc springs 22 when the coned disc springs 22 are in closed contact with each other.

For example, when the rack guide 18 is made of aluminum, the seat plate 23 has the function of restraining abrasion of the seat face 34 of the rack guide 18 by preventing the seat face 34 of the rack guide 18 from making contact with the coned disc springs 22. Therefore, the seat plate 23 is made of, for example, steel or resin. The outer periphery 25a of the protrusion 25 of the closure member 20 and the inner periphery 24a of the recessed portion 24 serve as opposed portions that are opposed to each other with a predetermined gap left therebetween. The O-ring 26 (elastic member) is held in an accommodation groove 36 formed in the outer periphery 25a of the protrusion 25, and is frictionally engaged with the inner periphery 24a (opposed portion) of the recessed portion 24. The O-ring 26 may be elastically compressed between the inner periphery 24a of the recessed portion 24 and the outer periphery 25a of the protrusion 25. However, O-ring 26 need not be elastically compressed between the inner periphery 24a of the recessed portion 24 and the outer periphery 25a of the protrusion 25

Figure 4:
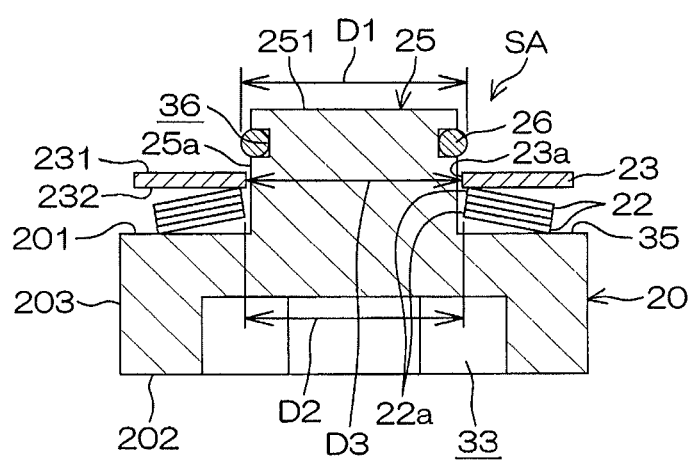
FIG. 4 is a sectional view of a subassembly formed in advance before the rack guide unit is assembled in the first embodiment, the subassembly including, for example, coned disc springs, an O-ring that may function as an elastic member constituting a retaining protrusion, and a closure member.

As illustrated in FIG. 4, the coned disc springs 22, the seat plate 23, the O-ring 26 (elastic member) and the closure member 20 constitute a subassembly SA that is assembled in advance before the rack guide 15 is assembled and that can be handled as one unit body. Specifically, the coned disc springs 22 and the seat plate 23 are disposed so as to surround the protrusion 25, and the O-ring 26 is held in the accommodation groove 36 formed at a position located closer to the distal end of the protrusion 25 than the coned disc springs 22 and the seat plate 23 are.

In the state of the subassembly SA, part of the O-ring 26 is overlapped with part of the coned disc springs 22 as viewed from the axial direction of the protrusion 25. That is, an outer diameter D1 of the annular O-ring 26 held in the accommodation groove 36 of the protrusion 25 is set larger than an inner diameter D2 of the coned disc springs 22 and an inner diameter D3 of the seat plate 23 (D1>D2, D1>D3). Thus, the O-ring 26 restrains the coned disc springs 22 and the seat plate 23 from coming off the protrusion 25.

According to the first embodiment, the retaining protrusion (O-ring 26 as an elastic member) disposed on the outer periphery 25a of the protrusion 25 of the closure member 20 restrains the coned disc springs 22 from coming off the protrusion 25. Thus, before the rack guide unit 15 is assembled, the coned disc springs 22 are held on the closure member 20 to assemble the coned disc springs 22 and the closure member 20 into the subassembly SA. Thus, it is possible to enhance the efficiency of assembly of the rack guide unit 15 as a whole.

The elastic member (O-ring 26) is easily fitted in the accommodation groove 36 formed in the outer periphery 25a of the protrusion 25, and thus the elastic member (O-ring 26) constitutes the retaining protrusion. Thus, it is possible to assemble the rack guide unit 15 with ease. Further, the elastic member (O-ring) 26 that constitutes the retaining protrusion is frictionally engaged with the inner periphery 24a of the recessed portion 24 in the rack guide 18. Thus, the elastic member (O-ring 26) applies a frictional resistance load that is superposed on a reaction load from the coned disc springs 22 to resist against displacement of the rack guide 18 caused by a load input from the rack shaft 8 side. Thus, it is possible to enhance a counteracting load against a reversed input load from the rack shaft 8 side.

Further, the annular seat plate 23 that bears a load from the coned disc springs 22 is interposed between the coned disc springs 22 and (the seat face 34 of) the rack guide 18. Thus, the coned disc springs 22 and the rack guide 18 are prevented from making contact with each other. Thus, it is possible to restrain abrasion of (the seat face 34 of) the rack guide 18. Moreover, the retaining protrusion (O-ring 26) restrains the seat plate 23 from coming off the protrusion 25. Thus, before the rack guide unit 15 is assembled, the coned disc springs 22, the seat plate 23 and the closure member 20 are assembled into the sub-assembly. Thus, it is possible to enhance the efficiency of assembly of the rack guide unit 15 as a whole. Further, with the use of the compression coil spring 21 in addition to the coned disc springs 22, the flexibility in setting the load is enhanced.

Figure 5:
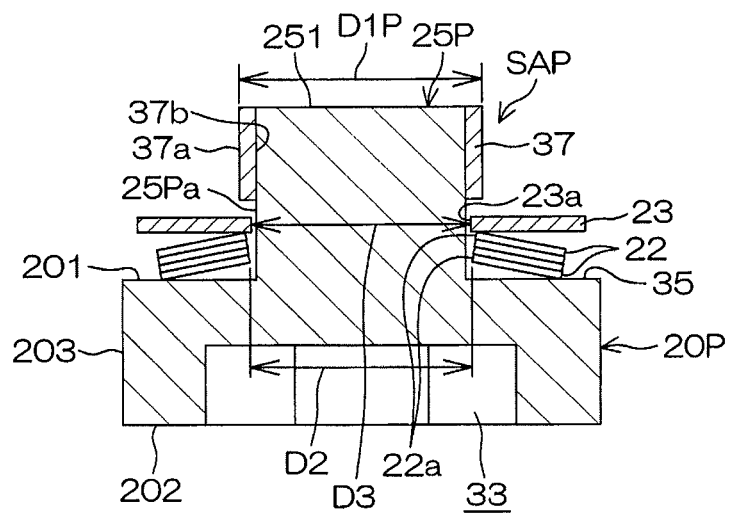
FIG. 5 is a sectional view of a subassembly formed in advance before a rack guide unit is assembled in a second embodiment of the invention, the subassembly including, for example, coned disc springs, a rolled bushing that may function as an elastic member constituting a retaining protrusion, and a closure member.

FIG. 5 illustrates a subassembly SAP in a rack guide unit according to a second embodiment of the invention. As illustrated in FIG. 5, the configuration in the second embodiment differs from the configuration in the first embodiment in FIG. 4 mainly in the following point. In the first embodiment, the O-ring 26 is used as the elastic member that constitutes the retaining protrusion.

On the other hand, in the subassembly SAP in the second embodiment illustrated in FIG. 5, as the elastic member constituting the retaining protrusion, there is used a rolled bushing 37 that is held on an outer periphery 25Pa of a protrusion 25P of a closure member 20P by press-fitting. An inner periphery 37b of the rolled bushing 37 is fitted on the outer periphery 25Pa of the protrusion 25P by press-fitting. If the outer periphery 37a of the rolled bushing 37 is frictionally engageable with the inner periphery of a recessed portion of a rack guide (corresponding to the inner periphery 24a of the recessed portion 24 of the rack guide 18 in the first embodiment illustrated in FIG. 3), the outer periphery 37a of the rolled bushing 37 may be formed of a metal layer serving as a frictionally engaging layer. If the outer periphery 37a of the rolled bushing 37 is formed of a resin layer that serves as a frictionally engaging layer having radial elasticity, the rolled bushing 37 may serve as the elastic member.

Although not illustrated in FIG. 5, the outer periphery 37a of the rolled bushing 37 is frictionally engaged with the inner periphery of the recessed portion of the rack guide. An outer diameter D1P of the rolled bushing 37 held on the outer periphery 25Pa of the protrusion 25P is set larger than the inner diameter D2 of the coned disc springs 22 and the inner diameter D3 of the seat plate 23 (D1P>D2, D1P>D3). Thus, the rolled bushing 37 restrains the coned disc springs 22 and the seat plate 23 from coming off the protrusion 25P.

The same components in the second embodiment illustrated in FIG. 5 as those in the first embodiment illustrated in FIG. 4 will be denoted by the same reference symbols as those in the first embodiment illustrated in FIG. 4. The second embodiment produces the same advantageous effects as those of the first embodiment. By using the subassembly SAP that is assembled in advance before the rack guide unit is assembled, it is possible to enhance the efficiency of assembly of the rack guide unit. Although not illustrated in FIG. 5, the rolled bushing 37 is frictionally engaged with the inner periphery of the recessed portion of the rack guide. Thus, the rolled bushing 37 applies a frictional resistance load to the rack guide against a reverse input load from the rack shaft side. As a result, it is possible to increase the counteracting force against the reverse input load.

Figure 6:
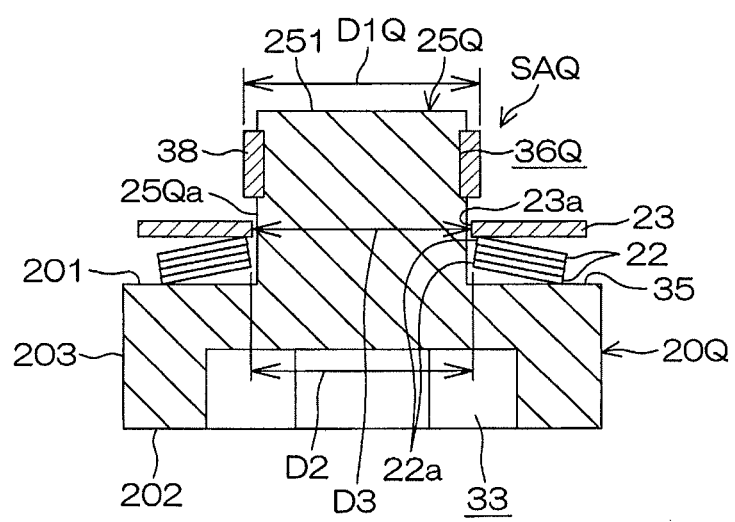
FIG. 6 is a sectional view of a subassembly formed in advance before a rack guide unit is assembled in a third embodiment of the invention, the subassembly including, for example, coned disc springs, a plurality of elastic bars that may function as elastic members constituting retaining protrusions, and a closure member.

FIG. 6 illustrates a subassembly SAQ in a rack guide unit according to a third embodiment of the invention. As illustrated in FIG. 6, the configuration in the third embodiment differs from the configuration in the first embodiment in FIG. 4 mainly in the following point. In the first embodiment, the O-ring 26 is used as the elastic member that constitutes the retaining protrusion.

Figure 9:
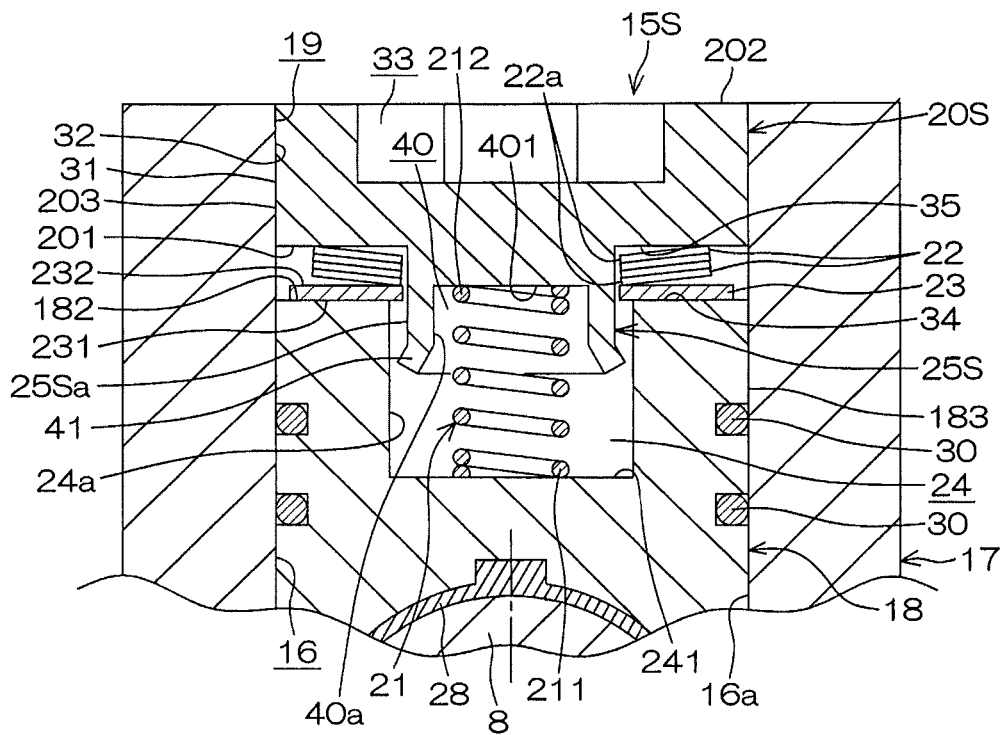
FIG. 9 is a sectional view of a rack guide unit according to a fifth embodiment of the invention.

On the other hand, in the subassembly SAQ in the third embodiment illustrated in FIG. 9, as the elastic member that constitutes the retaining protrusion, non-annular members are used. Specifically, as the elastic member, multiple elastic bars 38 that are made of rubber or resin and that extend in the height direction of a protrusion 25Q of a closure member 20Q are arranged at equal intervals in a circumferential direction K1 of the protrusion 25Q. Accommodation grooves 36Q extending in the height direction of the protrusion 25Q are formed in an outer periphery 25Qa of the protrusion 25Q so as to be arranged at equal intervals in the circumferential direction K1, and the elastic bars 38 are respectively fitted in the accommodation grooves 36Q. Displacement of the elastic bars 38 held in the accommodation grooves 36Q in the height direction of the protrusion 25Q is restricted.

A diameter D1Q of a circle that is circumscribed to the multiple elastic bars 38 is set larger than the inner diameter D2 of the coned disc springs 22 and the inner diameter D3 of the seat plate 23 (DQ1>D2, DQ1>D3). Thus, the multiple elastic bars 38 restrain the coned disc springs 22 and the seat plate 23 from coming off the protrusion 25Q. The same components in the third embodiment illustrated in FIG. 6 as those in the first embodiment illustrated in FIG. 4 will be denoted by the same reference symbols as those in the first embodiment illustrated in FIG. 4. The third embodiment produces the same advantageous effects as those of the first embodiment. By using the subassembly SAQ that is assembled in advance before the rack guide unit is assembled, it is possible to enhance the efficiency of assembly of the rack guide unit. Although not illustrated in FIG. 6, the multiple elastic bars 38 are frictionally engaged with the inner periphery of the recessed portion of the rack guide. Thus, the elastic bars 38 apply a frictional resistance load to the rack guide against a reverse input load from the rack shaft side. As a result, it is possible to increase the counteracting force against the reverse input load.

Figure 7:
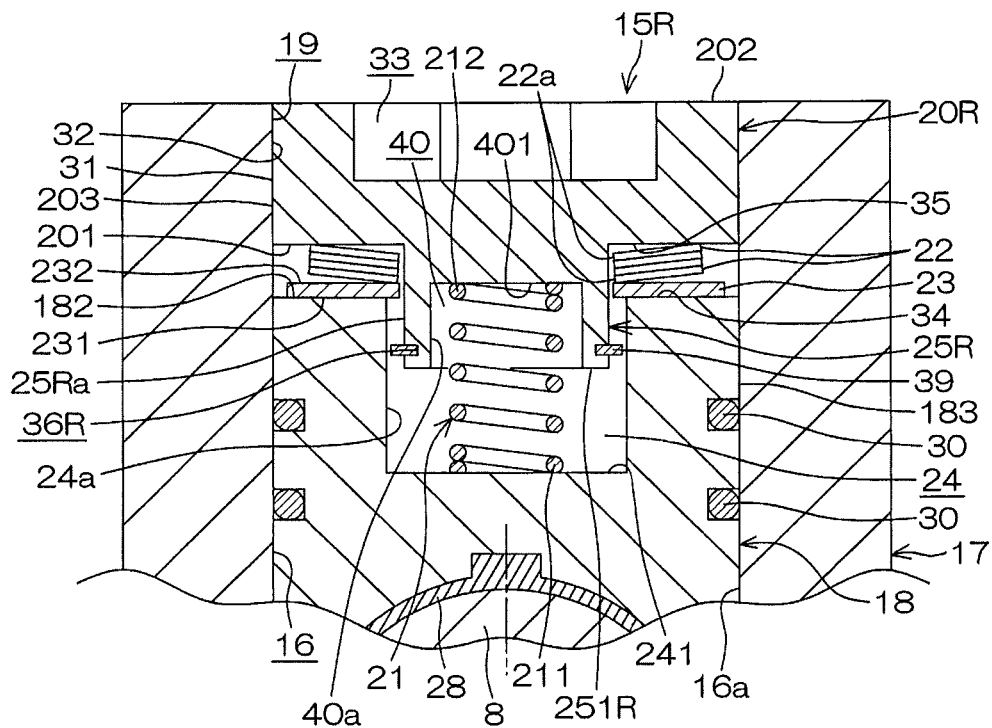
FIG. 7 is a sectional view of a rack guide unit according to a fourth embodiment of the invention.
Figure 8:
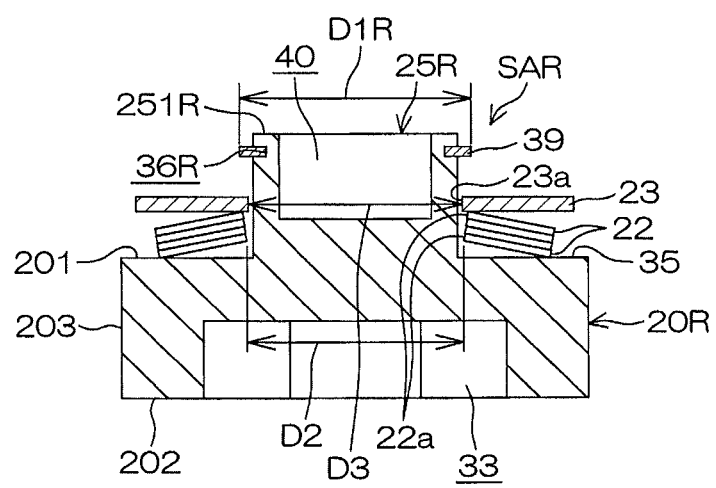
FIG. 8 is a sectional view of a subassembly formed in advance before the rack guide unit is assembled in the fourth embodiment, the subassembly including, for example, coned disc springs, a retaining ring constituting a retaining protrusion, and a closure member.

FIG. 7 is a sectional view that illustrates a rack guide unit 15R according to a fourth embodiment of the invention. FIG. 8 is a sectional view that illustrates a subassembly SAR that is assembled in advance before the rack guide unit 15R in the fourth embodiment is assembled. The configuration of the rack guide unit 15R in the fourth embodiment illustrated in FIG. 7 differs from that of the rack guide unit 15 in the first embodiment illustrated in FIG. 3 mainly in the following point. In the first embodiment illustrated in FIG. 3, the O-ring 26 (elastic member) held in the accommodation groove 36 formed in the outer periphery 25a of the solid protrusion 25 is used as the retaining protrusion. The O-ring 26 is frictionally engaged with the inner periphery 24a of the recessed portion 24 to impose a frictional resistance against the displacement of the rack guide 18.

On the other hand, in the rack guide unit 15R in the fourth embodiment illustrated in FIG. 7, a C-shaped retaining ring 39 that is held in an accommodation groove 36R formed in an outer periphery 25Ra of a protrusion 25R of a closure member 20R is used as the retaining protrusion. The retaining ring 39 is not engaged with the inner periphery 24a of the recessed portion 24. The retaining ring 39 may have a rectangular sectional shape as illustrated in FIG. 7, or a rounded sectional shape such as a circular sectional shape.

The protrusion 25R is hollow. That is, a recessed portion 40 is formed in an end face 251R of the protrusion 25R. Part of the compression coil spring 21 is disposed in the recessed portion 40 of the protrusion 25R. A second end portion 212 of the compression coil spring 21 is received at a bottom 401 of the recessed portion 40. An inner periphery 40a of the recessed portion 40 serves as a radially outer portion guide that guides the radially outer portions of the part of the compression coil spring 21.

As illustrated in FIG. 8, before the rack guide unit 15R is assembled, the subassembly SAR including the coned disc springs 22, the seat plate 23, the retaining ring 39 and the closure member 20R is formed in advance. An outer diameter D1R of the C-shaped retaining ring 39 held in the accommodation groove 36 formed in the protrusion 25R of the closure member 20R is set larger than the inner diameter D2 of the coned disc springs 22 and the inner diameter D3 of the seat plate 23 (D1R>D2, D1R>D3). Thus, the retaining ring 39 restrains the coned disc springs 22 and the seat plate 23 from coming off the protrusion 25R.

The same components in the fourth embodiment illustrated in FIG. 7 and FIG. 8 as those in the first embodiment illustrated in FIG. 3 and FIG. 4 will be denoted by the same reference symbols as those in the first embodiment illustrated in FIG. 3 and FIG. 4. The fourth embodiment produces the same advantageous effects as those of the first embodiment. By using the subassembly SAR that is assembled in advance before the rack guide unit is assembled, it is possible to enhance the efficiency of assembly of the rack guide unit. By using the C-shaped retaining ring 39 that is an inexpensive general purpose article as the retaining protrusion, the manufacturing cost is reduced. The retaining ring 39 is not frictionally engaged with the inner periphery 24a of the recessed portion 24 of the rack guide 18, and thus does not apply a frictional resistance load to the rack guide 18.

Figure 10:
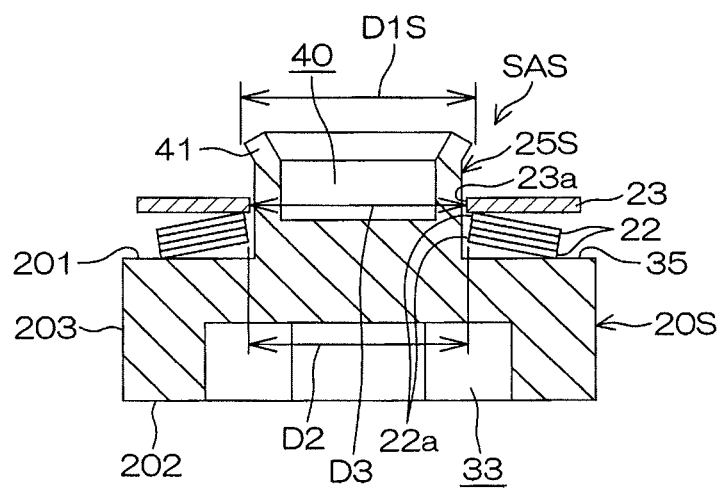
FIG. 10 is a sectional view of a subassembly formed in advance before the rack guide unit is assembled in the fifth embodiment, the subassembly including, for example, coned disc springs, and a closure member with a plastically deformed protrusion that constitutes a retaining protrusion.

FIG. 9 is a sectional view that illustrates a rack guide unit 15S according to a fifth embodiment of the invention. FIG. 10 is a sectional view that illustrates a subassembly SAS that is assembled in advance before the rack guide unit 15S in the fifth embodiment is assembled. The rack guide unit 15S in the fifth embodiment illustrated in FIG. 9 differs from the rack guide unit 15R in the fourth embodiment illustrated in FIG. 7 mainly in the following point. In the fourth embodiment illustrated in FIG. 7, the C-shaped retaining ring 39 held in the accommodation groove 36R formed in the outer periphery 25Ra of the protrusion 25R of the closure member 20R is used as the retaining protrusion.

On the other hand, in the rack guide unit 15S in the fifth embodiment illustrated in FIG. 9, a plastically deformed protrusion 41 formed by plastically deforming, for example, the distal end portion of a cylindrical protrusion 25S of the closure member 20S outward in the radial direction is used as the retaining protrusion. The plastically deformed protrusion 41 may be an annular protrusion formed around the entire outer periphery 25Sa of the protrusion 25S or may be formed of protrusions formed at multiple positions along the circumferential direction of the outer periphery 25Sa of the protrusion 25S.

As illustrated in FIG. 10, before the rack guide unit 15S is assembled, the subassembly SAS is prepared in advance. The subassembly SAS includes the coned disc springs 22, the seat plate 23 and the closure member 20S. The closure member 20S has the plastically deformed protrusion 41 (retaining protrusion). Specifically, the coned disc springs 22 and the seat plate 23 are fitted onto a protrusion of a workpiece that will be manufactured into the closure member before the plastically deformed protrusion 41 is formed, and then the plastically deformed protrusion 41 is formed. In this way, the subassembly SAS is assembled.

An outer diameter D1S of the plastically deformed protrusion 41 of the closure member 20S is set larger than the inner diameter D2 of the coned disc springs 22 and the inner diameter D3 of the seat plate 23 (D1S>D2, D1S>D3). Thus, with the plastically deformed protrusion 41, the coned disc springs 22 and the seat plate 23 are restrained from coming off the protrusion 25S. The same components in the fifth embodiment illustrated in FIG. 9 and FIG. 10 as those in the fourth embodiment illustrated in FIG. 7 and FIG. 8 will be denoted by the same reference symbols as those in the fourth embodiment illustrated in FIG. 7 and FIG. 8. The fifth embodiment produces the same advantageous effects as those of the fourth embodiment. By using the subassembly SAS that is assembled in advance before the rack guide unit is assembled, it is possible to enhance the efficiency of assembly of the rack guide unit. Further, because the retaining protrusion is formed of the plastically deformed protrusion 41 formed integrally with the protrusion 25S from the same material, the number of components is reduced. Thus, it is possible to reduce the manufacturing cost.

Figure 11:
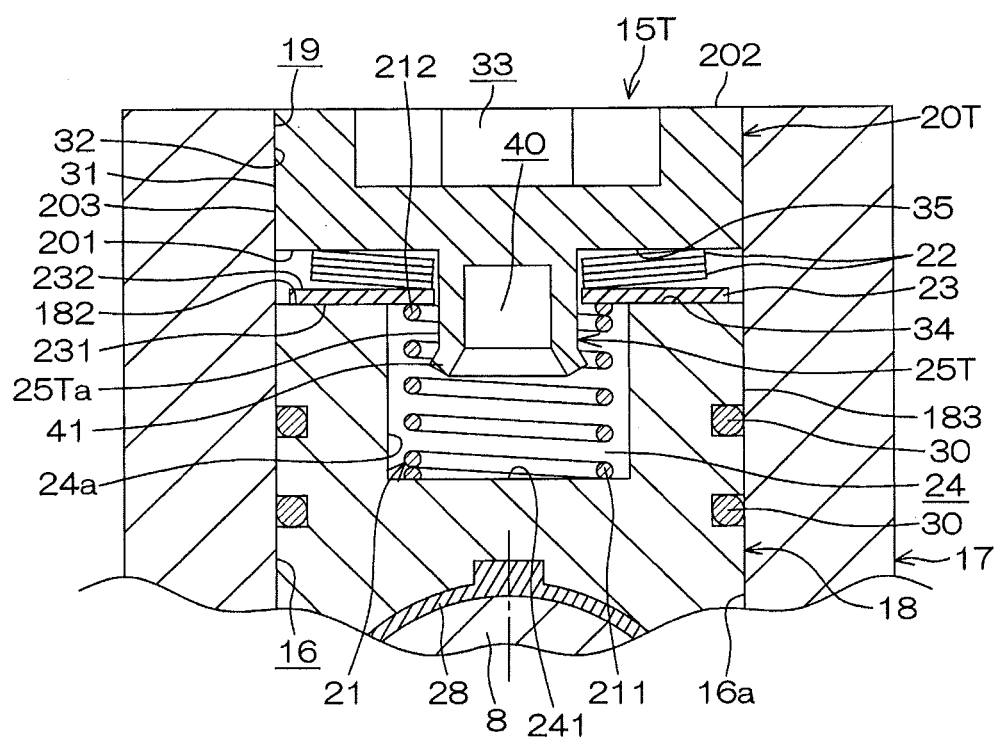
FIG. 11 is a sectional view of a rack guide unit according to a sixth embodiment of the invention.

FIG. 11 is a sectional view that illustrates a rack guide unit 15T according to a sixth embodiment of the invention. The configuration in the sixth embodiment illustrated in FIG. 11 differs from that in the fifth embodiment illustrated in FIG. 9 mainly in the following point. In the fifth embodiment illustrated in FIG. 9, the coned disc springs 22 and the compression coil spring 21 are disposed in parallel. Further, a part of the compression coil spring 21 is inserted in the recessed portion 40 of the hollow protrusion 25S of the closure member 20S.

On the other hand, in the rack guide unit 15T in the sixth embodiment illustrated in FIG. 11, the coned disc springs 22 and the compression coil spring 21 are disposed in series with the seat plate 23 interposed therebetween. Further, an outer periphery 25Ta of a hollow protrusion 25T of a closure member 20T is radially opposed to the radially inner portions of the coned disc springs 22 and the seat plate 23. The protrusion 25T is inserted in the compression coil spring 21. The same components in the sixth embodiment illustrated in FIG. 11 as those in the fifth embodiment illustrated in FIG. 9 will be denoted by the same reference symbols as those in the fifth embodiment illustrated in FIG. 9. The sixth embodiment produces the same advantageous effects as those of the fifth embodiment. By using a subassembly (not illustrated) that is assembled in advance before the rack guide unit is assembled, it is possible to enhance the efficiency of assembly of the rack guide unit. Further, because the coned disc springs 22 and the compression coil spring 21 are disposed in series, it is possible enhance the flexibility in setting a load for urging the rack guide 18.

The invention is not limited to the above-described embodiments. For example, instead of the O-ring used as the elastic member serving as the retaining protrusion, a ring having a rectangular sectional shape (not illustrated) may be used. Further, the invention may be implemented in various other embodiments within the scope of the appended claims.

What is claimed is:

1. A rack guide unit comprising:
   a rack guide accommodated in an accommodation portion formed in a housing through which a rack shaft meshed with a pinion shaft is passed, so as to be allowed to approach and move away from the rack shaft, the rack guide supporting the rack shaft such that the rack shaft is slidable in an axial direction of the rack shaft;
   a closure member secured to an external opening end of the accommodation portion, the external opening end being located on an opposite side of the accommodation portion from the rack shaft;
   at least one coned disc spring that is interposed between the closure member and the rack guide, and that urges the rack guide toward the rack shaft;
   a recessed portion formed in an opposed portion of the rack guide, the opposed portion being opposed to the closure member;
   a protrusion that is formed on the closure member, passed though the coned disc spring, and inserted in the recessed portion; and
   a retaining protrusion formed integrally with an outer periphery of the protrusion or formed separately from the protrusion and attached to the outer periphery of the protrusion, and located at a position closer to a distal end of the protrusion than the coned disc spring is, the retaining protrusion restraining the coned disc spring from coming off the protrusion.

2. The rack guide unit according to claim 1, wherein the retaining protrusion is an elastic member supported on the outer periphery of the protrusion.

3. The rack guide unit according to claim 2, wherein the elastic member is frictionally engaged with an inner periphery of the recessed portion.

4. The rack guide unit according to claim 3, wherein the retaining protrusion is a C-shaped retaining ring held in an accommodation groove formed in the outer periphery of the protrusion.

5. The rack guide unit according to claim 3, wherein:
   an annular seat plate is interposed between the coned disc spring and the rack guide to receive a load from the coned disc spring; and
   the retaining protrusion restrains the seat plate from coming off the protrusion.

6. The rack guide unit according to claim 2, wherein the retaining protrusion is a C-shaped retaining ring held in an accommodation groove formed in the outer periphery of the protrusion.

7. The rack guide unit according to claim 6, wherein:
   an annular seat plate is interposed between the coned disc spring and the rack guide to receive a load from the coned disc spring; and
   the retaining protrusion restrains the seat plate from coming off the protrusion.

8. The rack guide unit according to claim 2, wherein:
   an annular seat plate is interposed between the coned disc spring and the rack guide to receive a load from the coned disc spring; and
   the retaining protrusion restrains the seat plate from coming off the protrusion.

9. The rack guide unit according to claim 8, wherein a compression coil spring is interposed between the rack guide and the closure member to urge the rack guide toward the rack shaft.

10. The rack guide unit according to claim 2, wherein a compression coil spring is interposed between the rack guide and the closure member to urge the rack guide toward the rack shaft.

11. The rack guide unit according to claim 10, wherein the recessed portion has a cylindrical shape so as to guide radially outer portions of the compression coil spring.

12. The rack guide unit according to claim 1, wherein the retaining protrusion is a plastically deformed protrusion formed integrally with the protrusion and made of the same material as that of the protrusion.

13. The rack guide unit according to claim 12, wherein:
an annular seat plate is interposed between the coned disc spring and the rack guide to receive a load from the coned disc spring; and
the retaining protrusion restrains the seat plate from coming off the protrusion.

14. The rack guide unit according to claim 12, wherein a compression coil spring is interposed between the rack guide and the closure member to urge the rack guide toward the rack shaft.

15. The rack guide unit according to claim 14, wherein the recessed portion has a cylindrical shape so as to guide radially outer portions of the compression coil spring.

16. The rack guide unit according to claim 1, wherein:
an annular seat plate is interposed between the coned disc spring and the rack guide to receive a load from the coned disc spring; and
the retaining protrusion restrains the seat plate from coming off the protrusion.

17. The rack guide unit according to claim 16, wherein a compression coil spring is interposed between the rack guide and the closure member to urge the rack guide toward the rack shaft.

18. The rack guide unit according to claim 17, wherein the recessed portion has a cylindrical shape so as to guide radially outer portions of the compression coil spring.

19. The rack guide unit according to claim 1, wherein a compression coil spring is interposed between the rack guide and the closure member to urge the rack guide toward the rack shaft.

20. The rack guide unit according to claim 19, wherein the recessed portion has a cylindrical shape so as to guide radially outer portions of the compression coil spring.

* * * * *